United States Patent [19]
Tomida et al.

[11] Patent Number: 5,854,378
[45] Date of Patent: Dec. 29, 1998

[54] ASPARTIC ACID COPOLYMER AND PROCESS FOR PRODUCING THE SAME

[75] Inventors: Masayuki Tomida; Masako Yoshikawa; Takeshi Nakato, all of Ibaraki, Japan

[73] Assignee: Mitsubishi Chemical Corporation, Tokyo, Japan

[21] Appl. No.: 763,837

[22] Filed: Dec. 12, 1996

[30] Foreign Application Priority Data

Dec. 15, 1995 [JP] Japan .................................. 7-327080

[51] Int. Cl.$^6$ ..................................................... C08G 69/10
[52] U.S. Cl. ......................... 528/328; 528/363; 528/367; 525/469; 525/420; 525/432
[58] Field of Search ...................... 528/328, 363, 528/367; 525/419, 420, 432

[56] References Cited

U.S. PATENT DOCUMENTS 5,478,919  12/1995  Koskan ..................................... 528/363

FOREIGN PATENT DOCUMENTS 0613920   2/1994   European Pat. Off. .
WO 9509881  4/1995   WIPO .

*Primary Examiner*—Duc Truong
*Attorney, Agent, or Firm*—Sughrue, Mion, Zinn, Macpeak & Seas, PLLC

[57] ABSTRACT

This invention an aspartic acid copolymer obtained by copolymerizing a monomer mixture comprising (1) aspartic acid, maleamic acid and/or a reaction product of maleic acid and ammonia as a main monomer, (2) fumaric acid, and (3) succinic acid and containing 0.005 to 3% by weight, based on the total monomers, of ammonia in the form of an ammonium salt and hydrolyzing the resulting copolymer partially or completely; and a process for producing the same.

8 Claims, No Drawings

5,854,378

ASPARTIC ACID COPOLYMER AND PROCESS FOR PRODUCING THE SAME

FIELD OF THE INVENTION

This invention relates to an aspartic acid copolymer. More particularly, it relates to an aspartic acid copolymer having high biodegradability useful as a fertilizer, a scale inhibitor, a builder, a humectant, a dispersant, etc.

BACKGROUND OF THE INVENTION

Polyaspartic acid has been attracting attention as a substitute for polyacrylic acid because of its biodegradability.

Polyaspartic acid is obtained by polymerizing aspartic acid, maleamic acid and/or a reaction product of maleic acid and ammonia as a monomer with or without a solvent in the presence or absence of a catalyst to prepare polysuccinimide and hydrolyzing the polysuccinimide.

However, homopolyaspartic acid, particularly the one obtained by using no polymerization solvent, has insufficient biodegradability.

On the other hand, a copolyaspartic acid is known to be produced by copolymerizing the above-described monomer with a hydroxycarboxylic acid, such as glycolic acid or lactic acid, in the presence of a phosphoric acid catalyst (*Makromol. Chem.*, vol. 182, p. 2557 (1981), DE4221875 A1). According to this process, however, the yield of copolysuccinimide achieved is considerably low, and the resulting copolysuccinimide has only a small content of the hydroxycarboxylic acid component. As a result, the expected improvement on properties of the resulting aspartic acid copolymer has not been reached.

A process comprising copolymerization of an N-carboxylic acid anhydride synthesized from a glutamic ester and an aspartic ester is also known (*Biopolymers*, Vol. 29, p. 825 (1990)). However, since the comonomer used is very expensive, the process is hardly applicable on an industrial scale.

Further, these conventional techniques are concerned exclusively with preparation of binary copolymers comprising aspartic acid and one comonomer. Any combination of monomers within this limitation has not yet achieved an appreciable improvement on properties of the polyaspartic acid.

SUMMARY OF THE INVENTION

An object of the present invention is to solve the above-mentioned problems associated with the conventional techniques, that is, to provide an aspartic acid copolymer which exhibits improved biodegradability while retaining various physical properties possessed by polyaspartic acid (homopolymer), such as molecular weight, and to provide a process for producing the same.

As a result of extensive investigation, the inventors of the present invention have found that an aspartic acid copolymer having excellent biodegradability can be obtained by copolymerizing aspartic acid, etc., in the presence of specific organic acids. The present invention has been reached based on this finding.

The invention consists in an aspartic acid copolymer obtained by copolymerizing a monomer mixture comprising (1) aspartic acid, maleamic acid and/or a reaction product of maleic acid and ammonia as a main monomer, (2) fumaric acid, and (3) succinic acid and containing 0.005 to 3% by weight, based on the total monomers, of ammonia in the form of an ammonium salt and hydrolyzing the resulting copolymer partially or completely; and a process for producing the same.

The invention is further described below in detail.

DETAILED DESCRIPTION OF THE INVENTION

The monomer mixture which can be used in the invention contains 0.005 to 3% by weight of ammonia in the form of an ammonium salt based on the total monomers and comprises mainly aspartic acid, maleamic acid and/or a reaction product of maleic acid and ammonia, which is a monomer used in the production of a general aspartic acid homopolymer, and specific organic carboxylic acids.

The specific organic carboxylic acids to be used in the invention are a combination of at least fumaric acid and succinic acid, preferably a combination of fumaric acid, succinic acid, maleic acid, and malic acid.

The maleic acid includes maleic anhydride, a partial or complete maleic ester, and a mixture thereof. The fumaric acid includes a partial or complete fumaric ester and a mixture thereof.

The malic acid may be either a D-form or an L-form, or a mixture thereof. The succinic acid includes succinic anhydride, a partial or complete succinic ester, and a mixture thereof.

While the proportions of these organic acids are not particularly limited, it is preferable that the proportions of maleic acid, fumaric acid, malic acid, and succinic acid in the total monomer mixture are 0.005 to 7.0% wt %, 0.005 to 8.0 wt %, 0.01 to 0.8 wt %, and 0.0001 to 0.3 wt %, respectively; more particularly 0.008 to 6.0 wt %, 0.005 to 7.0 wt %, 0.01 to 0.6 wt %, and 0.0002 to 0.25 wt %, respectively; most prefereably 0.01 to 5.5 wt %, 0.005 to 5.0 wt %, 0.01 to 0.5 wt %, and 0.0003 to 0.2 wt %, respectively.

If the proportion of fumaric acid exceeds the above range, the yield of the copolymer tends to reduce. If it is lower than that range, the effect in improving biodegradability is hardly manifested.

The aspartic acid as a monomer may be a D-form, an L-form, or a mixture thereof.

The maleamic acid as a monomer can be obtained by, for example, heating mono- or diammonium maleate.

The reaction product between maleic acid and ammonia, which is used as a monomer, can be prepared in a conventional manner. Typical examples of the preparation are described in German Patent 3,626,672 and U.S. Pat. Nos. 4,839,461 and 5,286,810. The reaction product as produced by the above process consists mainly of monoammonium maleate and may further contain other products, such as maleic acid, diammonium maleate, ammonia, fumaric acid, aspartic acid, asparagine, iminodisuccinic acid, and maleamic acid. The maleic acid includes an anhydride and a partial or complete ester. Ammonia can be used as gas or a solution. When used as a solution, ammonia is dissolved in water to give an aqueous solution of ammonium hydroxide or dissolved in an alcohol (e.g., methanol or ethanol) or any other appropriate organic solvent.

The monomer mixture contains an ammonium salt in an amount of 0.005 to 3% by weight in terms of ammonia. In view of a balance between a molecular weight and biodegradability of the resulting copolymer, a preferred ammonia content is from 0.01 to 2.5% by weight, more particularly 0.01 to 2% by weight. If the ammonia content is less than 0.005% by weight, the biodegradability improving effect is insubstantial. If it exceeds 3% by weight, the resulting copolymer will have a considerably reduced molecular weight.

The monomer mixture may further contain other copolymerizable monomers in a total amount not exceeding 50% by weight. The copolymerizable monomers are not particularly limited and include (a) an aspartic acid salt; (b) glutamic acid or a salt thereof; (c) amino acids other than (a) and (b), e.g., alanine, leucine and lysine; (d) hydroxycarboxylic acids, such as glycolic acid, lactic acid and 3-hydroxyacetic acid; and (e) compounds having at least one functional group capable of reacting with an amino group and a carboxylic acid, such as 2-hydroxyethanol and aniline.

The method for preparing the monomer mixture is not particularly restricted. For example, the monomer mixture is prepared by mixing aspartic acid, maleamic acid and/or a reaction product of maleic acid and ammonia with organic acids (maleic acid, fumaric acid, malic acid, etc.) in a commonly used mixer or blender. The monomer mixture can be a mixture obtained in the manufacture of aspartic acid which comprises the unreacted materials and by-products. It is preferable that maleic acid, fumaric acid and malic acid be dispersed as uniformly as possible in aspartic acid, maleamic acid and/or the reaction product of maleic acid and ammonia.

The copolymerization can be carried out with or without a solvent. The solvent, if used, includes a solvent having a boiling point of 100° C. or higher which is selected from the group consisting of a hydrocarbon, a halogenated hydrocarbon, an ether, an ester, and an aprotic polar solvent. Solvents having a boiling point of 130° C. or higher are preferred. The solvents may be used either individually or as a mixture thereof. Suitable hydrocarbons are xylene, diethylbenzene (xylene or diethylbenzene may be an o-, m- or p-isomer alone or a mixture of two or more isomers), toluene, amylbenzene, cumene, mesitylene, and tetralin. Suitable halogenated hydrocarbons are chlorotoluene, dichlorobenzene (chlorotoluene or dichlorobenzene may be an o-, m- or p-isomer alone or a mixture of two or more isomers), 1,4-dichlorobutane, and chlorobenzene. Suitable ethers are dichloroethyl ether, butyl ether, diisoamyl ether, and anisole. Suitable esters include n-amyl acetate, isoamyl acetate, methylisoamyl acetate, cyclohexyl acetate, benzyl acetate, n-butyl propionate, isoamyl propionate, isoamyl butyrate, and n-butyl butyrate. Suitable aprotic polar solvents are N,N-dimethylformamide, N,N-dimethylacetamide, N-methyl-2-pyrrolidone, 1,3-dimethyl-2-imidazolidinone, tetramethyluric acid, dimethyl sulfoxide, sulfolane, and hexamethylphosphoroamide. Preferred of them are diethylbenzene, mesitylene, cumene, chlorotoluene, 1,4-dichlorobutane, diisoamyl ether, n-butyl acetate, 1,3-dimethyl-2-imidazolidinone, and sulfolane for their suitable boiling point. Still preferred are mesitylene, cumene, chlorotoluene, 1,3-dimethyl-2-imidazolidinone, and sulfolane.

The solvent can be used in an amount of 100 to 5,000 parts by weight, preferably 200 to 2,000 parts by weight, per 100 parts by weight of aspartic acid, maleamic acid and/or a reaction product of ammonia and maleic acid.

It is preferable to use a catalyst for manifestation of a marked effect in improving biodegradability. An acid catalyst is preferred. Examples of suitable acid catalysts include inorganic acid catalysts, such as sulfuric acid, sulfuric anhydride, phosphoric acid, polyphosphoric acid, metaphosphoric acid, condensed phosphoric acid, and phosphoric anhydride; and organic acid catalysts, such as p-toluenesulfonic acid, trichloroacetic acid, trifluoroacetic acid, and trifluoromethanesulfonic acid. Phosphoric acid type catalysts are preferably used for ease of obtaining a polymer in high yield.

The acid catalyst is used usually in an amount of 0.002 to 0.5 mol, preferably 0.02 to 0.3 mol, per mole of the monomers.

The polycondensation reaction is carried out usually at a temperature of 100° to 300° C., preferably 130° to 280° C. If the temperature is lower than 100° C., the reaction does not proceed smoothly. If the temperature exceeds 300° C., decomposition products tend to be produced.

The reaction pressure is not limited. The reaction can be carried out under atmospheric pressure or reduced pressure or under pressure, preferably under atmospheric pressure or reduced pressure.

The reaction time is from 1 second to 100 hours, preferably 10 seconds to 50 hours, still preferably 20 seconds to 10 hours. The time when by-production of water comes to an end is practically taken as an end point of the reaction.

For the purpose of molecular weight control, an amine and the like may be present in the polycondensation reaction system. The reaction mixture is worked up in a usual manner selected appropriately in accordance with the end use of the polymer. For example, the solvent is removed by centrifugation. The resulting precipitate may be washed with water or a low-boiling point solvent. Examples of the polycondensation reaction are given, e.g., in JP-B-48-20638 (the term "JP-B" as used herein means an "examined published Japanese patent application"), U.S. Pat. Nos. 4,839,461, 5,057,597 and 5,219,986, and EP 578,449.

The resulting copolymer is hydrolyzed in accordance with a conventional manner. Typical examples of the hydrolysis are described in *J. Am. Chem. Soc.*, Vol. 80, p. 3361 (1958), *J. Org. Chem.*, Vol. 26, p. 1084 (1961). U.S. Pat. Nos. 5,221,733 and 5,288,783, and JP-A-60-203636 (the term "JP-A" as used herein means an "unexamined published Japanese patent application"). For example, hydrolysis is preferably carried out in an aqueous medium at 0° to 30° C. under atmospheric pressure or under pressure. The hydrolysis of the copolymer is carried out partially or completely, desirably to a degree of hydrolysis of 70% or more.

The invention will now be illustrated in greater detail with reference to Examples, but it should be understood that the invention is not deemed to be limited thereto.

Analysis and evaluation of the copolymers produced were made in accordance with the following methods.
1) Weight average molecular weight (Mw) of polysuccinimide copolymer:

The weight average molecular weight was measured by a differential refractometer gel-permeation chromatography (GPC) (on polystyrene conversion) using TSK gel GMHHR-M and TSK gel G2000 HHR columns produced by Tosoh Corp. and, as an eluent, dimethylformamide containing 10 mM LiBr.
2) Biodegradability of aspartic acid copolymer:

Biodegradability was determined according to biodegradability test method for new chemical substance (modified method MITI (II)) specified in Law concerning the Examination and Regulation of Manufacture, etc. Activated sludge purchased from Kagakuhin Kensa Kyokai was used as microorganisms. The testing was conducted under the following conditions.

MLSS (activated sludge concentration): 30 mg/l

Sample concentration: 100 mg/l

Sample volume: 300 ml

Testing temperature: 25±1° C.

Testing period: 28 days

Reference substance: aniline

The rate of degradation was obtained in terms of percentage based on the measurement of total organic carbon content (TOC). Specifically, TOC of the organic substance of the sample in the culture was determined at the start of the testing. The decrease in TOC due to partial decomposition of carbon in the sample and release as carbonic acid gas was obtained by measuring TOC after 28-day testing and divided by the TOC at the start of the testing to obtain a rate of degradation (%).

A closed system oxygen consumption measuring apparatus (autographic BOD meter manufactured by Ohkura Electric Co., Ltd.) was used for the biodegradation test, and a TOC meter (TOC-5000 manufactured by Shimadzu Corp.) was used as a TOC measuring apparatus.

3) Copolymerization ratio:

The sample was dissolved in deutero dimethylformamide (DMSO-$d_6$), and the $^1$H-NMR spectrum was taken at room temperature by use of GSX-400 manufactured by Nihon Denshi K.K. to determine the copolymerization ratio of the copolymer. Peaks of the individual components assigned to the hydrogen atom of the carbon-carbon double bond are as follows.

Maleic acid component at the polymer terminal: $\delta$=7.12 ppm, 2H; fumaric acid component at the polymer terminal: $\delta$=6.55, 6.87 ppm, 2H; fumaric acid component at the polymer terminal: $\delta$=6.80 ppm, 2H.

Malic acid seems to be dehydrated during copolymerization and converted to maleic acid or fumaric acid.

PREPARATION EXAMPLE 1

In a mixer (Oster Blender) were put 98.9 g of L-aspartic acid, 0.89 g of maleic acid, 0.012 g of fumaric acid, 0.032 g of malic acid, and 0.001 g of succinic acid and mixed at room temperature for 10 minutes. To the mixture was added 0.64 g of 25% aqueous ammonia, followed by mixing at room temperature for 5 minutes. Finally, 10.0 g of 85% phosphoric acid was added to the mixture, followed by mixing at room temperature for 10 minutes to obtain a mixture (designated mixture 1).

PREPARATION EXAMPLE 2

In a mixer (Oster Blender) were put 96.2 g of L-aspartic acid, 3.11 g of maleic acid, 0.041 g of fumaric acid, 0.091 g of malic acid, and 0.002 g of succinic acid and mixed at room temperature for 10 minutes. To the mixture was added 2.8 g of 25% aqueous ammonia, followed by mixing at room temperature for 5 minutes. Finally, 10.0 g of 85% phosphoric acid was added to the mixture, followed by mixing at room temperature for 10 minutes to obtain a mixture (designated mixture 2).

PREPARATION EXAMPLE 3

In a mixer (Oster Blender) were put 94.0 g of L-aspartic acid, 4.91 g of maleic acid, 0.061 g of fumaric acid, 0.12 g of malic acid, and 0.005 g of succinic acid and mixed at room temperature for 10 minutes. To the mixture was added 3.5 g of 25% aqueous ammonia, followed by mixing at room temperature for 5 minutes. Finally, 10.0 g of 85% phosphoric acid was added to the mixture, followed by mixing at room temperature for 10 minutes to obtain a mixture (designated mixture 3).

PREPARATION EXAMPLE 4

In a mixer (Oster Blender) were put 100 g of L-aspartic acid and 10.0 g of 85% phosphoric acid, followed by mixing at room temperature for 10 minutes to obtain a mixture (designated mixture 4).

PREPARATION EXAMPLE 5

In a mixer (Oster Blender) were put 96.89 g of L-aspartic acid, 3.11 g of maleic acid, and 10.0 g of 85% phosphoric acid, followed by mixing at room temperature for 10 minutes to obtain a mixture (designated mixture 5).

PREPARATION EXAMPLE 6

In a mixer (Oster Blender) were put 96.3 g of L-aspartic acid, 3.11 g of maleic acid, 0.041 g of fumaric acid, and 10.0 g of 85% phosphoric acid, followed by mixing at room temperature for 10 minutes to obtain a mixture (designated mixture 6).

PREPARATION EXAMPLE 7

In a mixer (Oster Blender) were put 96.2 g of L-aspartic acid, 3.11 g of maleic acid, 0.041 g of fumaric acid, 0.091 g of malic acid, and 10.0 g of 85% phosphoric acid, followed by mixing at room temperature for 10 minutes to obtain a mixture (designated mixture 7).

PREPARATION EXAMPLE 8

In a mixer (Oster Blender) were put 96.2 g of L-aspartic acid, 3.11 g of maleic acid, 0.041 g of fumaric acid, and 0.091 g of malic acid, followed by mixing at room temperature for 10 minutes. To the mixture was added 2.8 g of 25% aqueous ammonia, followed by mixing at room temperature for 5 minutes. Finally, 10.0 g of 85% phosphoric acid was added to the mixture, followed by mixing at room temperature for 10 minutes to obtain a mixture (designated mixture 8).

EXAMPLE 1

Forty grams of mixture 1 obtained in Preparation Example 1 was allowed to react in a 60 ml-volume Labo Plastomill manufactured by Toyo Seiki K.K. at 230° C. and 50 rpm for 30 minutes. After completion of the reaction, a yellowish white product was taken out.

The molecular weight of the product on polystyrene conversion was 23,000 as measured by GPC.

Three grams of the resulting copolymer and 10 g of water were put in a reactor, and an aqueous solution of 1.4 g of sodium hydroxide in 20 g of water was added thereto under cooling with ice, followed by stirring for 1 hour to conduct hydrolysis (degree of hydrolysis: 100%). After the reaction, the reaction mixture was poured into 300 ml of methanol to obtain a sodium salt of an aspartic acid copolymer as a precipitate.

The TOC of the sodium salt of an aspartic acid copolymer was determined to find that the rate of biodegradation was 70%.

COMPARATIVE EXAMPLE 1

Copolymerization was carried out in the same manner as in Example 1, except for replacing mixture 1 with mixture 4 obtained in Preparation Example 4; The resulting copolymer had a weight average molecular weight of 25,000. The sodium salt of an aspartic acid copolymer obtained after hydrolysis was found to have a rate of biodegradation of 60% as a result of TOC measurement.

TABLE 1

| Example No. | ASP (g) | MA (g) | FA (g) | Malic Acid (g) | Succinic Acid (g) | Aqueous Ammonia (g) | Mw | Biodegradability (%) |
|---|---|---|---|---|---|---|---|---|
| Example 2 | 96.2 | 3.11 | 0.04 | 0.091 | 0.002 | 2.8 | 20000 | 71 |
| Compara. Example 2 | 96.89 | 3.11 | — | — | — | — | 20000 | 55 |
| Compara. Example 3 | 96.3 | 3.11 | 0.04 | — | — | — | 20000 | 54 |
| Compara. Example 4 | 96.2 | 3.11 | 0.04 | 0.091 | — | — | 19000 | 51 |
| Compara. Example 5 | 96.2 | 3.11 | 0.04 | 0.091 | — | 2.8 | 18000 | 56 |

EXAMPLE 2

Copolymerization was carried out in the same manner as in Example 1, except for replacing mixture 1 with mixture 2 obtained in Preparation Example 2. The resulting copolymer had a weight average molecular weight of 20,000. The sodium salt of an aspartic acid copolymer obtained after hydrolysis was found to have a rate of biodegradation of 71% as a result of TOC measurement.

COMPARATIVE EXAMPLE 2

Copolymerization was carried out in the same manner as in Example 1, except for replacing mixture 1 with mixture 5 obtained in Preparation Example 5. The resulting copolymer had a weight average molecular weight of 20,000. The sodium salt of an aspartic acid copolymer obtained after hydrolysis was found to have a rate of biodegradation of 55% as a result of TOC measurement.

COMPARATIVE EXAMPLE 3

Copolymerization was carried out in the same manner as in Example 1, except for replacing mixture 1 with mixture 6 obtained in Preparation Example 6. The resulting copolymer had a weight average molecular weight of 20,000. The sodium salt of an aspartic acid copolymer obtained after hydrolysis was found to have a rate of biodegradation of 54% as a result of TOC measurement.

COMPARATIVE EXAMPLE 4

Copolymerization was carried out in the same manner as in Example 1, except for replacing mixture 1 with mixture 7 obtained in Preparation Example 7. The resulting copolymer had a weight average molecular weight of 19,000. The sodium salt of an aspartic acid copolymer obtained after hydrolysis was found to have a rate of biodegradation of 51% as a result of TOC measurement.

COMPARATIVE EXAMPLE 5

Copolymerization was carried out in the same manner as in Example 1, except for replacing mixture 1 with mixture 8 obtained in Preparation Example 8. The resulting copolymer had a weight average molecular weight of 18,000. The sodium salt of an aspartic acid copolymer obtained after hydrolysis was found to have a rate of biodegradation of 56% as a result of TOC measurement.

The results of Examples 2 to Comparative Example 5 are shown in Table 1 below.

As is apparent from Table 1, the copolymer according to the invention exhibits improved biodegradability without undergoing reduction in molecular weight as compared with those lacking part of the monomer composition as shown in Comparative Examples.

EXAMPLE 3

Copolymerization was carried out in the same manner as in Example 1, except for replacing mixture 1 with mixture 3 obtained in Preparation Example 3. The resulting copolymer had a weight average molecular weight of 19,000. The sodium salt of an aspartic acid copolymer obtained after hydrolysis was found to have a rate of biodegradation of 68% as a result of TOC measurement.

EXAMPLE 4

In a 300 ml-volume four-necked flask equipped with a condenser, a thermometer, a stirrer, and a water separator were charged 40 g of mixture 2 obtained in Preparation Example 2, 100 g of mesitylene, and 50 g of sulfolane. Polycondensation reaction was conducted under mesitylene reflux under atmospheric pressure for 4.5 hours. The water produced was driven out of the system together with mesitylene.

After completion of the reaction, the reaction mixture was filtered, and the collected product was washed four 200 g portions of water and a 200 g portion of methanol. The product was dried at 80° C. under reduced pressure for 24 hours to give 28.5 g of a yellowish white product.

The weight average molecular weight of the product on polystyrene conversion was 26,000 as measured by GPC.

In a reactor were charged 3 g of the resulting copolymer and 10 g of water, and an aqueous solution of 1.4 g of sodium hydroxide in 20 g of water was added thereto under cooling with ice. The mixture was stirred for 1 hour to conduct hydrolysis. The reaction mixture was poured into 300 ml of methanol to obtain a sodium salt of an aspartic acid copolymer as a precipitate.

The TOC of the resulting copolymer was determined to find that the rate of biodegradation was 93%.

COMPARATIVE EXAMPLE 6

Copolymerization was carried out in the same manner as in Example 4, except for replacing mixture 2 with mixture 4 obtained in Preparation Example 4. The resulting copolymer had a weight average molecular weight of 65,000. The sodium salt of an aspartic acid copolymer obtained after hydrolysis was found to have a rate of biodegradation of 89% as a result of TOC measurement.

The copolymer of the invention comprises an aspartic acid component as a main component and, in addition, specific organic carboxylic acid components, such as fumaric acid and succinic acid. The copolymer usually has a molecular weight of from 1,000 to 100,000. The copolymer is water soluble and suited for use as a scale inhibitor, a builder, a dispersant, etc. Because the copolymer has excellent biodegradability, it is advantageous for environmental conservation.

While the invention has been described in detail and with reference to specific embodiments thereof, it will be apparent to one skilled in the art that various changes and modifications can be made therein without departing from the spirit and scope thereof.

What is claimed is:

1. An aspartic acid copolymer obtained by copolymerizing a monomer mixture comprising (1) aspartic acid, maleamic acid and/or a reaction product of maleic acid and ammonia as a main monomer, (2) fumaric acid, and (3) succinic acid and containing 0.005 to 3% by weight, based on the total monomers, of ammonia in the form of an ammonium salt and hydrolyzing the resulting copolymer partially or completely.

2. An aspartic acid copolymer according to claim 1, wherein the monomer mixture contains 0.005 to 8% by weight of (2) fumaric acid and 0.0001 to 0.3% by weight of (3) succinic acid each based on the total monomers.

3. An aspartic acid copolymer according to claim 1, wherein the monomer mixture further comprises (4) maleic acid and (5) malic acid.

4. An aspartic acid copolymer according to claim 3, wherein the monomer mixture contains 0.005 to 7% by weight of (4) maleic acid and 0.01 to 0.8% by weight of (5) malic acid each based on the total monomers.

5. A process for producing an aspartic acid copolymer comprising:

copolymerizing a monomer mixture comprising (1) aspartic acid, maleamic acid and/or a reaction product of maleic acid and ammonia as a main monomer, (2) fumaric acid, and (3) succinic acid and containing 0.005 to 3% by weight, based on the total monomers, of ammonia in the form of an ammonium salt; and hydrolyzing the resulting copolymer partially or completely.

6. A process according to claim 5, wherein the monomer mixture further comprises (4) maleic acid and (5) malic acid.

7. A process for producing an aspartic acid copolymer comprising:

copolymerizing a monomer mixture comprising (1) aspartic acid, maleamic acid and/or a reaction product of maleic acid and ammonia as a main monomer, (2) fumaric acid, (3) succinic acid, (4) maleic acid and (5) malic acid and containing 0.005 to 3% by weight, based on the total monomers, of ammonia in the form of an ammonium salt; and hydrolyzing the resulting copolymer partially or completely, wherein the (2) fumaric acid, and (3) succinic acid, (4) maleic acid and (5) malic acid each may be partly in the form of an ammonium salt and wherein the (2) fumaric acid is used in an amount of 0.005 to 8.0% by weight, the (3) succinic, acid is used in an amount of 0.0001 to 0.3% by weight, the (4) maleic acid is used in an amount of from 0.005 to 7.0% by weight and the (5) malic, acid is used in an amount of from 0.01 to 0.8% by weight based on the total monomers.

8. A process according to any one of claims 5, 6 or 7, wherein the copolymerization is carried out in the presence of an acid catalyst.

* * * * *